April 1, 1958        E. C. ADAMS        2,828,768
VALVE CONTROL DEVICE
Filed July 29, 1955        3 Sheets-Sheet 1
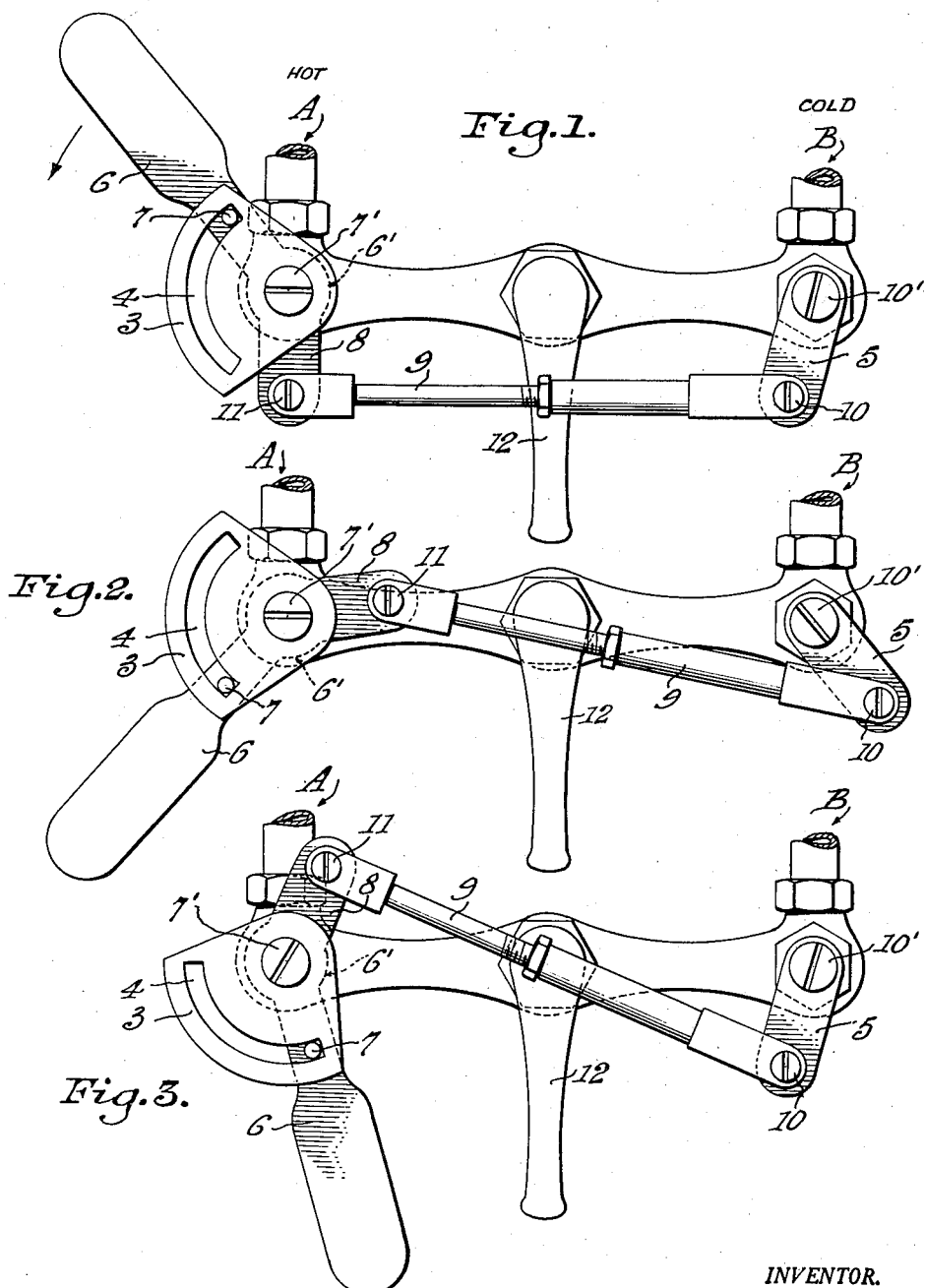
INVENTOR.
Ernest C. Adams
BY
ATTORNEYS April 1, 1958    E. C. ADAMS    2,828,768
VALVE CONTROL DEVICE
Filed July 29, 1955    3 Sheets-Sheet 2
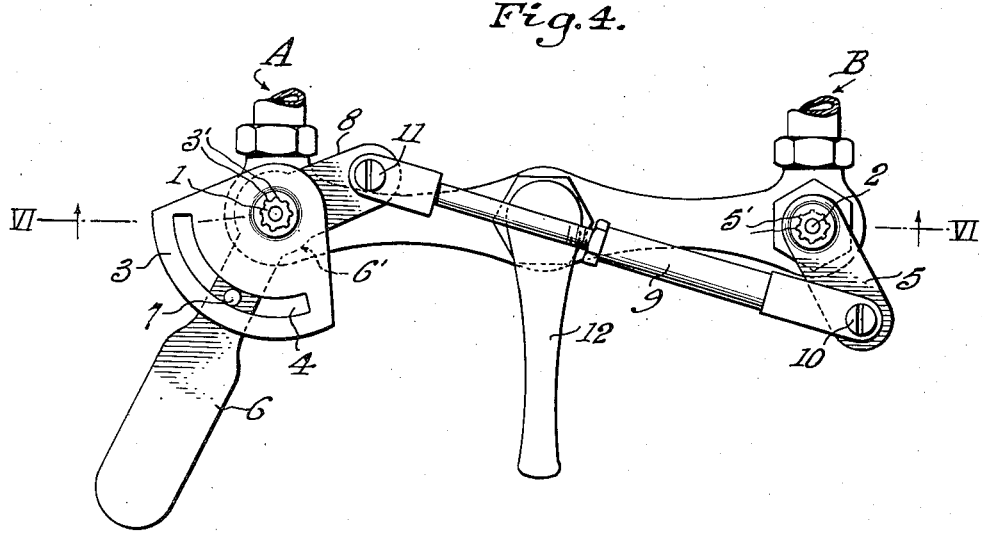
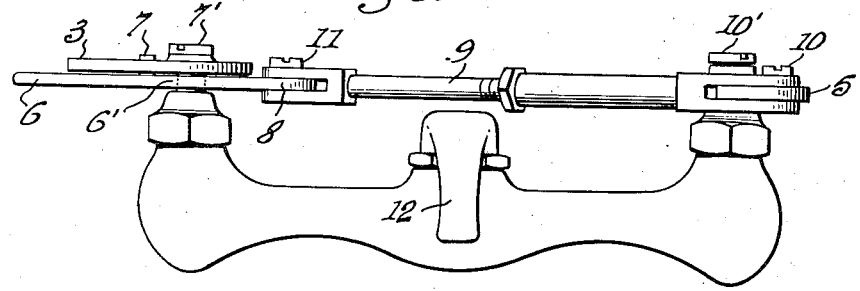
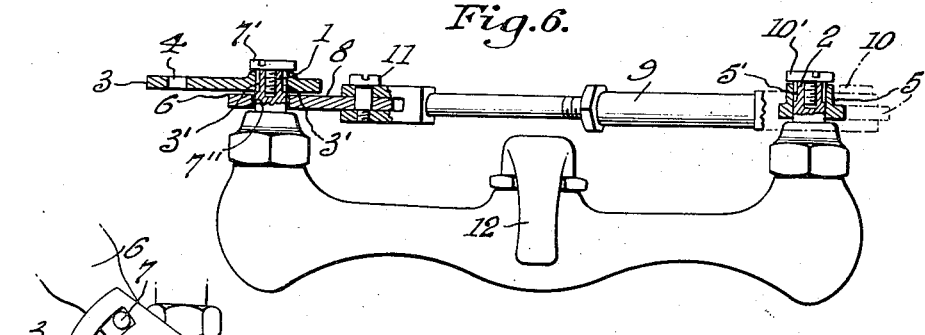
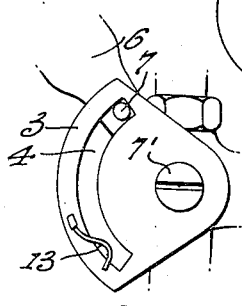
INVENTOR.
Ernest C. Adams
ATTORNEYS

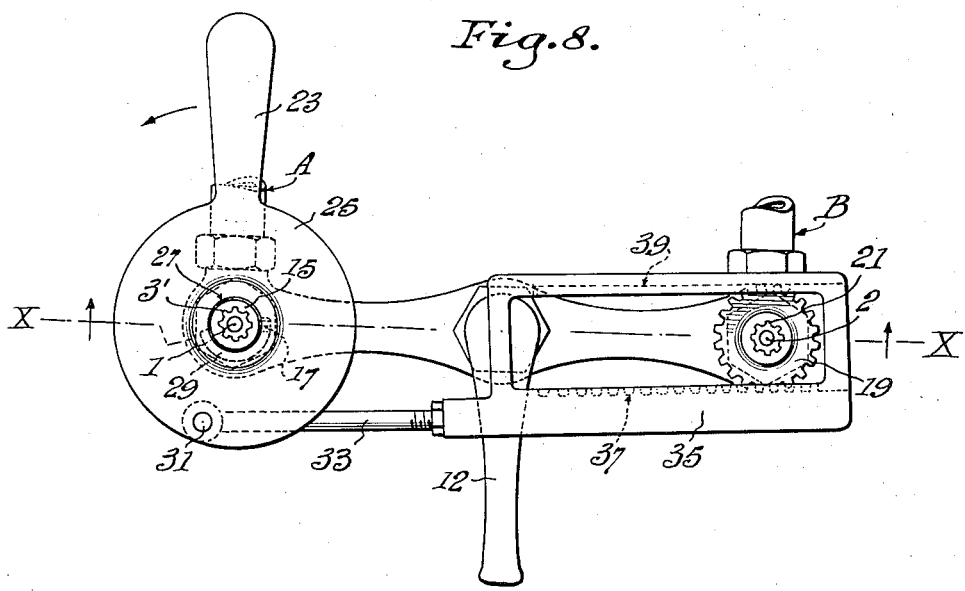
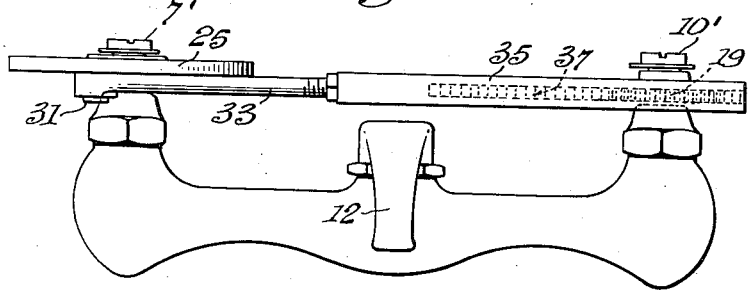
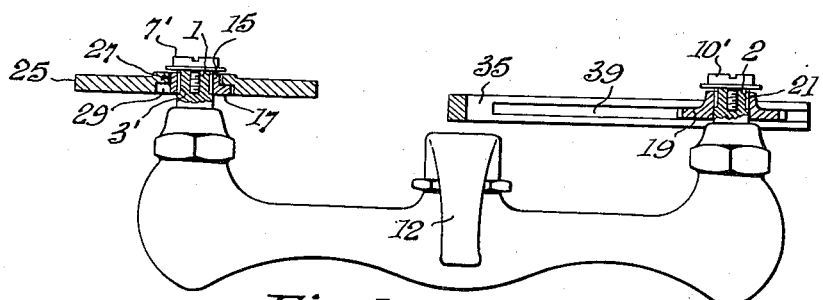

United States Patent Office 2,828,768
Patented Apr. 1, 1958

2,828,768

VALVE CONTROL DEVICE

Ernest C. Adams, Dieterich, Ill.

Application July 29, 1955, Serial No. 525,410

15 Claims. (Cl. 137—630.16)

(Granted under Title 35, U. S. Code (1952), sec. 266)

The invention described herein, may be manufactured and used by or for the Government for governmental purposes, without the payment to me of any royalty thereon.

The present invention provides improvements in means for simultaneously controlling the operation of two separate valves located in hot and cold branches of water supply lines for providing all hot water or all cold water, or any desired mixture thereof, the improvements of the invention providing simple and economical means for modifying conventional hot and cold water valves in shower baths or other points of water usage to provide the well known advantages of a mixing valve, but which do not require modification of the conventional valve structure, nor any disconnection or replacement of valves or pipes for installation. The invention also provides increased safety to a user as related to accidental improper manipulation of hot water valves and additionally, provides also important savings in water consumption as related to slow trial and error adjustment of conventional valves to provide suitable temperatures for a desired use. The improved control means of the invention are applied to conventional valves in such a manner that the manipulation of a single handle or lever to a selected position provides a selected proportion of hot water in the combined flow from the two valves.

Many different constructions of so-called "mixing valves" are known and are used widely, such valves being designed and constructed to provide a flow of water at a selected temperature by manipulations of a single handle or lever. Such devices, however, are integrally designed and specially fabricated in their entirety for initial installation to provide such service in a water outlet system, whereas the improvements of the present invention provide mechanical control means for attachment to simple and inexpensive conventional valves of the type commonly found installed in shower baths, tubs, and sinks and other similar points of use, the present improvement permitting the modification of an existing installation for producing the effects of a mixing valve without requiring removal of existing conventional valves and without disconnecting or altering the water pipe system in effecting the installation of the present improved simultaneous control.

More particularly, the present invention has for an object a single lever and linkage control for attachement to any two conventional and simple mechanical valves of a type commonly installed at locations of rugged service such as for example, wash rooms of military stations or barracks, to control the inflow of hot and cold water to a point of use, such as a shower bath, tub, sink, or receptacle by which a selected open setting of the lever provides a proportional opening of the two valves and a flow of water at a selected temperature which varies with the selection of lever setting.

A further object of the invention is to provide means for simultaneously controlling the operation of two such conventional type valves wherein a first increment or stage of motion applied as an opening action to the lever initiates a flow of cold water only, while continued motion of the lever through a further increment of its opening cycle effects simultaneous closure of the cold water valve and opening of the hot water valve, thus providing settings for water flow of increasing temperature, and terminating the opening cycle with a flow of hot water only.

Further objects and advantages of the improvements of the present invention will become apparent as the description proceeds, and the features of novelty will be pointed out in particularity in the appended claims.

The invention will be understood more readily by reference to the accompanying drawings, in which:

Fig. 1 is a top plan view of the improved valve control of the present invention as applied to a pair of conventional type valves positioned in hot and cold water supply lines, the view indicating both valves in closed position;

Fig. 2 is a view similar to Fig. 1, but showing the position of the parts at the termination of the first phase of the operating cycle, wherein one of the valves e. g. the hot water valve, is still closed, while the other valve, e. g. the cold water valve, is fully open;

Fig. 3 is a view similar to Figs. 1 and 2, but showing the positions at the end of the opening cycle, wherein the hot water valve is fully open and the cold water valve is closed;

Fig. 4 is a still similar view but showing the manner of mounting the parts of the improved construction on the valve spindles, the parts being shown in an intermediate position with both valves partly open;

Fig. 5 is a front elevation of the showing of Fig .4.

Fig. 6 is a sectional view taken on the line VI—VI of Fig. 4, looking in the direction of the arrows;

Fig. 7 is a fragmentary plan view of a slightly modified construction;

Fig. 8 is a top plan view of a modified form of the instant construction, the view showing in full lines the position of the parts when the modified form of the control means is in closed position;

Fig. 9 is a front elevation of the modification of Fig. 8;

Fig. 10 is a vertical sectional view through the modification of Fig. 8, the view being taken on the line X—X of Fig. 8, looking in direction of the arrows.

In general terms, the present improved construction provides a single operating lever and linkage for attachment to two water valves of a conventional type, one of the valves being for hot water and the other for cold water, by means of which lever and linkage the first increment of motion in counterclockwise direction initiates a flow of cold water only, and continued counterclockwise movement of the lever effects simultaneous closure of the cold water flow and opening of the hot water flow up to complete closing of the cold water flow and complete opening of the hot water flow. The operating handle or lever is mounted on the spindle or shaft of the hot water valve, on which spindle also is mounted an operating plate having an arcuate slot therein, the plate being fixedly mounted on the valve spindle above the said operating lever or handle, which carries an operating pin for the plate, which pin extends through the arcuate slot in the plate for operating the plate responsively to turning movement of the handle following a lost motion stage of rotation of the handle during which stage the pin is merely riding in the said arcuate slot. Connected to this operating handle or lever is a link which is attached to the spindle or shaft of the cold water valve, so that counterclockwise rotation of the operating lever first opens the cold water valve, thereby eliminating any danger of the operator becoming scalded by contact with initially excessively hot water, and when the pin riding in the arcuate slot reaches the counterclockwise end of the slot, further counterclockwise movement of the actuating handle picks up actuation of the plate, which then begins counterclockwise rotation in conjunction with continued rotation of the actuating handle, thereby progressively opening the hot water valve, the cold water valve continuing to be fully open. As the actuating handle continues counterclockwise rotation past center with respect to the connecting link, the effective direction of actuation of the link becomes reversed and also the direction of rotation of the cold water valve is reversed, so that closing thereof begins. Continued counterclockwise movement of the operating handle progressively closes the cold water valve to complete closure, and also progressively opens the hot water valve to full flow of hot water. Conversely, clockwise rotation of the operating handle first progressively opens the cold water valve, providing a phase of warm flow of water, the hot water valve remaining fully open during the lost motion stage of rotation of the operating handle as the pin on the handle rides clockwise in its slot, the hot water valve closing progressively responsive to clockwise rotation of the plate after the pin engages the clockwise end of the said slot. Continued clockwise rotation of the operating handle and the plate closes both valves.

Referring now more particularly to the drawings, A represents the hot water supply line, and B is the cold water supply line. In each of these lines is a control valve of any standard or conventional type, reference numeral 1 indicating the rotating shaft or spindle of a common hot water valve fitted at its exposed end with a screw for securing an operating handle or knob to the shaft. Similarly, reference numeral 2 is a similar shaft or spindle for a cold water valve located in cold water supply line B which is adjacent to the hot water supply line A.

Secured firmly on the hot water valve shaft or spindle 1 by cooperating splines 3' or other rigid attaching means is a quadrant sector plate 3, the valve spindle 1 extending through the narrow or apex portions of the plate, the said plate having an arcuate quadrant slot 4 in its wide portions which slot is concentric with shaft or spindle 1 of the valve. A lever arm 5 is mounted on spindle 2 of the cold water valve for controlling operation of this valve, by keys or splines.

An operating handle 6 is a common operating member for both valves. This handle 6 constitutes a longer arm of a valve operating bell crank 6', of which arm 8, which is integral with the handle 6, is the shorter arm, the shaft or spindle 1 of the hot water valve being at the fulcrum or elbow of this bell crank. The bell crank 6' is mounted on the valve shaft or spindle 1 by means of a free moving bearing 7". The operating handle 6 carries a pin 7 which extends through the arcuate slot 4 in the plate 3. While the angularity between the operating handle 6 and the short arm 8 of the bell crank 6' is not especially critical, in practice an angle of approximately 140 degrees is found to be conveniently suitable, this being approximately the angle shown on the drawings.

It may be noted also that the drawings illustrate a typical valve installation wherein both valves are opened by a counterclockwise rotation of their shafts or spindles, and wherein a spindle rotation for either valve of approximately 90 degrees provides a normal flow of water.

The aforementioned lever arm 5 on the cold water spindle 2 is conveniently, in practice, approximately the same length as the short lever arm 8 of the valve operating bell crank 6'. The lever arm 6 also is approximately parallel to the lever arm when both valves are in "off" position. This lever arm 5 is interconnected by a connecting rod 9 to the short lever arm 8 of the operating handle 6, attachment of the connecting rod 9 to the lever arm 5 being made by a pivotal attaching screw 10, which pivotally connects the connecting rod 9 to the lever arm 5. A similar attaching screw 11 pivotally connects this connecting rod to the lever arm 8. This connecting rod 9 comprises threadedly connected telescoping sections as shown, the provision of threadedly interconnected sections enabling adjustment of the overall length of the rod as may be required to bridge the space between lever arms 8 and 5 and to effect proper pivotal connection thereto. The opposite ends of the adjustable sections of the connecting rod are provided with bifurcated bearing elements, the lever arms 8 and 5 entering the space of the bifurcations and the pivot connecting screws 11 and 10 passing through registering holes provided therefor in the bifurcations and lever arms. A common water outlet 12 is provided for the water-lines A and B.

As is indicated on the drawings, both valves are in closed position in Fig. 1. In Fig. 2, the operating handle 6 has been turned counterclockwise with the pin 7 moved through the length of the arcuate slot 4 until it abuts against the bottom, or counterclockwise, end of the slot as viewed in Figs. 1 through 4. This represents a turning through an arc of approximately 90 degrees, which obviously equally turns the short arm 8. This rotation of the bell crank 6' of which the lever arm 8 is an integral part as aforesaid, is reactive immediately on the connecting rod 9 to push this connecting rod against lever arm 5 on valve spindle 2, thereby progressively opening this valve during the amount of lost motion of the bell crank corresponding to the distance traveled by the pin 7 between the opposite ends of the arcuate slot 4, thereby producing a flow of cold water only, the hot water valve remaining closed during this lost motion. Therefore, cold water only flows from outlet 12 during this interval of lost motion corresponding to the distance of travel of the pin 7 from the top end of the arcuate slot 4 as viewed in Fig. 1 to the bottom end of the slot as viewed in Fig. 2, during which lost motion rotation of the operating handle 6 and bell crank 6', the lever arm 8 of the bell crank is pushing against the rigid connecting rod or link 9, which transmits such pushing action against the lever arm 5 to cause the latter to rotate the valve spindle 2, thereby progressively opening the cold water valve while the hot water valve remains unaffectedly closed.

After the pin 7 reaches the lower or counterclockwise, end of the slot 4 as viewed in Fig. 2, further counterclockwise rotation of the operating handle 6 with its pin 7, pulls the sector plate 3 along with it in counterclockwise direction, and as the plate 3 is mounted rigidly on the valve spindle 1 by a plurality of cooperating splines 3' and releasable screw 7', which extends through narrow portions of the sector plate 3 and into the valve spindle 1, this counterclockwise movement of the bell crank 6' causes the plate 3 to turn the valve spindle 1, thereby opening the hot water valve progressively as the counterclockwise rotation of the bell crank 6' and plate 3 continues. At the same time, lever arm 8 of bell crank 6' passes center position with respect to the connecting rod 9, thereby converting the pushing action of lever arm 8 against the connecting rod 9 into a pulling action, thus reversing the movement of the lever arm 5 on the valve spindle 2, and progressively closes the cold water valve as the hot water valve continues to open, a mixture of cold and hot water of progressively increasing temperature issuing from outlet 12 until the cold water valve becomes fully closed, and only hot water is discharged through the outlet 12.

As will be seen from the drawings, for example Fig. 4, means may be provided for adjusting the angularity between the sector plate 3 and the bell crank 6' so as to adjust the length of the "lost motion arc" of rotation in accordance with differences in installations so that a shorter arc of such rotation may be effective under specifically different conditions, it is desirable to provide a multiplicity of complemental splines 3' between the plate 3 and the valve spindle 1. Also, adjustment of the lever arm 5 relative to the valve spindle 2 may be obtained by providing a multiplicity of complemental splines 5' between the spindle 2 and the lever arm 5. Removal of the screw 7' enables the plate 3 to be removed from its spindle 1 for enabling the aforesaid adjustment between the plate 3 and bell crank 6' to be made; and in like manner, removal of retaining screw 10' from spindle 2 enables lever arm 5 to be removed from the latter, and by means of the multiplicity of splines 5' between the spindle 2 and lever arm 5, the position of the latter relative to its spindle 2 may be varied as may be needed to correspond to such adjustments as may have been made between plate 3 and bell crank 6' to change the length of the arc of lost motion rotation through which the setting of the valve spindle 1 either in "off" or "on" position remains unaffected.

Now, when the operating handle 6 is rotated in the opposite direction, that is in clockwise direction, during the first increment of about 90 degrees of its return cycle from the fully hot position, the plate 3 does not move because of the free motion of the pin 7 in the slot 4, and the hot water valve remains open at full flow. At the same time and during the same period of motion the cold water valve is progressively opened to full normal flow, thus providing an optional phase of high volume warm flow. Fig. 4 is indicative of this condition and shows the position of the elements of the system for producing this effect, the hot water valve being fully open and the cold water valve being about half open.

While this optional phase of high volume warm flow is desirable, there may be employed also optionally, a retainer spring 13 which is mounted to extend into the slot 4 as shown in Fig. 7, this spring providing a moderate grip on the pin 7 as the latter approaches the end of the slot 4, thus causing immediate initiation of the closing of the hot water valve as clockwise rotation of the operating handle 6 is begun.

However, regardless of whether the optional spring 13 is used, the final increment of about 90 degrees of clockwise rotation of the operating handle 6 effects complete closure of both the hot and cold water valves.

The connecting rod 9 is shown on the drawings as being a sectional rod of adjustable length through provision of threads which interconnect the sections, the adjustable length of the connecting rod 9 being provided for the purpose of permitting installation of the rod on valves mounted at varying distances apart and for providing an installation adjustment to the final and simultaneous seating of both the hot and cold water valves when the operating handle 6 is rotated clockwise to the fully closed portion.

The preferred form of the present construction utilizes an arrangement of the levers in the general manner illustrated in Figs. 1 through 4, omitting the use of the optional spring 13, and including a cover plate or housing, not shown, designed to attractively conceal working parts and bearing a dial marked to indicate the cold, warm, hot, high volume warm and off position of the operating handle 6.

The construction shown in Figs. 8, 9 and 10 of the accompanying drawings illustrates certain modifications of the improved control which differ in structural details from the form described above, but which operate in similar manner and include, importantly, means for operating both the cold and hot water valves, to provide a suitable leverage in all positions when the control system is designed to turn the valves through an arc up to substantially 180°. In this connection, it may be pointed out with respect to the construction of the system illustrated in Figs. 1 through 7 of the drawings, the use of the simple lever 5 on the cold water valve-spindle 2 limits the arc of opening of the valve to about 90°, since the leverage is greatly lessened when the angular direction of the arm 5 approaches that of the connecting rod 9. While the great majority of valves open to full flow at about 90°, others do not, and the modified construction illustrated in Figs. 8 through 10 is provided where a turning of substantially 180° is required for full flow.

Referring in detail to Figs. 8, 9 and 10, it will be seen that secured firmly on the hot water valve spindle 1 by cooperating splines 3', or by other rigid attaching means, is a sleeve 15 having an upstanding lug 17 for a purpose hereinafter described. The spindle 2 of the cold water valve has mounted rigidly thereon a gear 19, connected to the spindle 2 by keys or splines 21.

An operating handle 23 is an operating member for both "cold" and "hot" valves. This handle 23 is integral with an enlarged circular discal hub 25, which is mounted concentrically on sleeve 15 by a free-moving bearing 27, an arcuate slot 29 in the underside of the hub 25 receiving the lug 17 on the sleeve 15, this slot 29 allowing a rotation of the operating handle 23 through an arc of substantially 180° before the lug 17 reaches the end of the slot 29 to induce rotation in the valve spindle 1.

The discal hub 25 of operating handle 23 has mounted adjacent to its periphery by means of a screw or rivet pin 31, a connecting rod 33, terminating at its opposite end in a substantially rectangular rack-frame 35 having teeth 37 meshing wtih the teeth of gear 19 on spindle 2 of the cold water valve, the teeth 37 being on an inner long side of the frame, the opposite long side of the frame having an inner elongated straight slot 39 for receiving the gear 19 which rotates in the slot 39 as well as along the teeth 37.

As has been pointed out above, the arcuate slot 29 in the discal hub 25 in valve spindle 1, allows a rotation of the operating handle 23 through an arc of substantially 180° before the lug 17 reaches the corresponding end of the slot 29 to induce rotation in valve spindle 1. During this initial rotation, the connecting rod 33, which is connected to the discal hub 25 by attaching pin 31, actuates rack 35 to rotate the gear 19 and the cold valve spindle 2 for opening the cold valve. As the connecting pin 31 passes center with respect to the connecting rod 33, the lug 17 is engaged by the end of slot 29 to produce rotation in the hot valve spindle 1. Continued rotating of operating handle 23 produces a simultaneous closure of the cold valve spindle 1 and opening of the hot valve spindle 2, the operation of the valves being the same as that hereinbefore described.

The foregoing description is directed to the present improved valve control means applied to a pair of valves controlling a supply of hot and cold water, this being the most usual type of installation, and requires no substantial modification of already existing installations of such character in attaching thereto the improved control means provided by the present invention, which also can be installed in similar manner on valves of conventional type being included in new equipment. However, it will be understood that as a valve control, the present control means may be employed in connection with a pair of valves located in fluid suppy lines generally, wherever selected proportions of fluids of different characteristics, such as fluids of controlled temperatures and concentrations, as well as of different compositions are desired to be delivered to the outlet therefor. In other words, ti will be understood that the present invention is adapted to the control of fluid supply valves generally, which valves are of standard types and which may have been installed previously to the attachment of the present equipment to such valves, or which may be about to be included in newly provided installations, that is, the pres ent equipment is not limited to water control valves.

Although preferred forms of the invention and a control system embodying the improved features of construction have been described above and illustrated in the accompanying drawings, it will be apparent that the foregoing specification and accompanying drawings are to be regarded as being illustrative only, and that structural details and arrangement of parts may be further modified in various ways if so desired without departing from the spirit of the invention. Accordingly, it will be understood that it is intended and desired to include within the scope of the invention such modifications and changes as may be necessary or desired to adapt it to varying conditions and uses, as defined in the appended claims.

Having thus described my invention, what I claim as new and wish to secure by Letters Patent is:

1. Control means for effecting simultaneous controlled actuation of a pair of valves, the first of which valves is a hot water valve positioned in a hot water line for delivering controlled volumes of hot water therefrom, the second of which valve is a cold water valve located in a cold water line for delivering controlled volumes of cold water therefrom, there being a common discharge outlet for the water lines connected thereto through the valves, each valve including an operating spindle therefor, the control means including a valve operating bell crank loosely mounted on the first valve spindle, one arm of the bell crank being an operating handle for the bell crank, and the other arm of the bell crank being a valve actuating lever arm, a second valve actuating lever arm rigidly mounted on the second valve spindle, a rigid actuating link pivotally interconnecting the valve actuating lever arms, a valve control plate rigidly secured to the first valve spindle adjacent to the bell crank, means operatively connecting the said plate and bell crank for rotating the plate following a predetermined free rotation of the bell crank about its valve spindle and relative thereto, during which free rotation the lever arm of the bell crank pushes the said rigid actuating link against the second lever arm, thereby rotating the second lever arm together with the second valve spindle responsive to initiation of rotation of the bell crank for progressively opening the second valve throughout the free rotation of the bell crank around its spindle while the first valve remains closed, whereby water flows only through the second valve, continued rotation of the bell crank in the same direction then rotating the said valve control plate together with the first valve spindle for progressively opening the first valve during the continued rotation of the bell crank and the plate, such continued rotation of the bell crank and plate ultimately passing center position relative to the said rigid actuating link, the continued rotation of the bell crank and plate past the said center position pulling the rigid actuating link to progressively close the second valve as the first valve progressively opens for producing a mixed discharge through both valves until the second valve is closed and only the first valve is open, when water becomes discharged through the first valve only, reverse directional rotation of the bell crank first producing a pushing action against the rigid actuating link for opening the second valve while the open first valve remains unaffected, thereby producing a selected mixed discharge through both valves until center position relative to the rigid link is passed, continued rotation of the bell crank in the reverse direction then rotating the plate in the said direction for pulling the said link and second lever arm, continued rotation of the bell crank and plate in the reverse direction finally closing both valves to stop the discharge.

2. Valve control means as claimed in claim 1, wherein the valve control plate is a quadrant sector plate having an arcuate quadrant slot in wide portions of the plate concentric with the first valve spindle, the latter extending through narrow portions of the plate, and the means operatively connecting the plate and bell crank include a pin extending through the slot from the operating handle of the bell crank, and movable between opposite ends of the slot responsively to rotation of the bell crank through an arc equal to the length of the slot, the said length of the slot determining the amount of lost motion of the bell crank through which the first valve remains unaffected.

3. Valve control means as claimed in claim 1 wherein the rigid interconnecting link comprises relatively adjustable telescoping sections enabling lengthways adjustment of the link for accommodation thereof to varying distances between the lever arm on the bell crank and the lever arm on the second valve spindle.

4. Valve control means as claimed in claim 2, wherein the valve control plate is a sector shaped plate, the means operatively connecting the plate and bell crank being the said pin extending through the slot in the plate from the operating handle of the bell crank together with a screw passing through the plate into the first valve spindle, the said plate and spindle having a plurality of cooperating complemental spline elements enabling angular adjustments between the plate and valve spindle responsively to release of the screw, thereby enabling corresponding adjustments of the amount of lost motion between the said plate and bell crank during which the first valve remains unaffected.

5. Control means for effecting simultaneous controlled actuation of a pair of valves in selected sequential increments, the first of which valves is a hot water valve positioned in a hot water line for delivering controlled volumes of hot water therefrom, the second of which valves is in a cold water line for delivering controlled volumes of cold water therefrom, there being a common discharge outlet for the water lines connected thereto through the valves, each valve including an operating spindle therefor, the said control means comprising a valve operating bell crank loosely mounted on the first valve spindle for free rotation relative to the spindle, one arm of the bell crank being an operating handle and the other arm being a valve actuating lever arm, a second valve actuating lever arm rigidly mounted on the second valve spindle, means including a connecting rod connecting the lever arm of the bell crank to the second lever arm valve, operating means rigidly mounted on the first valve spindle, and means operatively interconnecting the operating handle of the bell crank and the valve operating means on the first valve spindle, the last mentioned interconnecting means including cooperating complemental instrumentalities remaining relatively inactive during a selected lost motion increment of rotation of the operating handle used in the bell crank in counterclockwise direction for maintaining the first valve unaffected in closed position during the said lost motion increment of rotation while the connecting rod operates the second lever arm and the second valve spindle in counterclockwise direction immedaitely responsive to initiation of the counterclockwise rotation of the bell crank, thereby progressively opening the second valve during the lost motion increment of counterclockwise rotation of the bell crank, further counterclockwise rotation of the bell crank through an additional increment of rotation activating the said cooperating complemental instrumentalities for progressively opening the first valve and reversing direction of actuation of the second lever arm by the connecting rod for progressively closing the second valve as the first valve opens to fully open position, then reverse rotation of the operating handle and bell crank in clockwise direction first through the lost motion increment of rotation pushes the connecting rod against the second lever arm for progressively opening the second valve while the first valve remains unaffectedly open, further clockwise rotation of the operating handle and bell crank beyond the said lost motion increment of rotation reversing actuation of the connecting rod and causing the latter to pull upon the second lever arm to close the second valve while actuating the said cooperating complemental instrumentalities for effecting closing of the first valve as the second valve closes.

6. Control means for effecting simultaneous controlled operation of a pair of valves, one of which is a first valve including a first rotary spindle for selectively opening and closing the valve, the other of the valves being a second valve including a second rotary spindle for selectively opening and closing the second valve, the control means including a bell crank mounted loosely on the first spindle and freely rotatable relative thereto, one arm of the bell crank being an operating handle and the other arm being a valve operating lever arm, a second lever arm rigidly connected to the second valve spindle, rigid operating means connecting the lever arm of the bell crank to the second lever arm on the second valve spindle, operating means for the first valve spindle rigidly mounted thereon, the bell crank being operable through successive increments, a first of which increments being a lost motion increment with respect to the first valve spindle during which increment the first valve remains unaffectedly closed, while the second valve is operated progressively in a selected direction throughout the first increment of movement of the bell crank through movement transmitted from the lever arm of the bell crank to the said second lever arm through the rigid means connecting the said lever arms, and means connecting the bell crank and the operating means for the first valve spindle and becoming operative responsively to completion of the first increment of movement of the bell crank and continuing operable during further movement of the bell crank through a second increment of such movement, the first valve progressively operating in the same direction during the said second increment of movement of the bell crank, while the direction of operation of the second valve becomes reversed during the second increment of movement of the bell crank, whereby in a given operating cycle the second valve first progressively opens during the lost motion increment of movement of the bell crank, and progressively closes during the second increment of movement of the bell crank, during which second increment the first valve progressively opens while the second valve progressively closes, reverse rotation of the bell crank about the first valve spindle constituting first a lost motion increment with respect to the first valve which remains unaffectedly fully open throughout this lost motion increment while the second valve progressively opens, continued operation of the bell crank in the said reverse rotation thereof following the lost motion increment progressively closing the first valve while again reversing direction of rotation of the second lever arm and the second valve spindle, thereby producing progressive and simultaneous closing of both the first and second valves.

7. The control means as claimed in claim 6 wherein the bell crank is freely rotatable about the first valve spindle in counterclockwise and clockwise directions, selectively, rotation of the bell crank in counterclockwise direction being in two stages, the first of which is a lost motion stage with respect to the first valve which remains closed throughout the said lost motion stage of rotation of the bell crank while the second valve is shifted progressively from closed to fully open position, the second stage of counterclockwise rotation of the bell crank then operating the first valve spindle to turn the same progressively from closed to fully open position while the second valve is shifted progressively from its fully open position to closed position, clockwise rotation of the bell crank also being in two stages, the first of which is a lost motion stage with respect to the first valve which remains unaffectedly fully open throughout the lost motion stage, while the second valve is shifted progressively from its closed position to fully open position, further clockwise rotation of the bell crank beyond the lost motion stage producing progressive and simultaneous closing of both valves.

8. The control means as claimed in claim 7 wherein the first valve remains fully closed at the end of the lost motion stage of counterclockwise rotation of the bell crank and the second valve is fully open for discharging a fluid only through the second valve, the second stage of counterclockwise rotation of the bell crank effecting complete closing of the second valve and opening of the first valve for discharging fluid only through the first valve, the first valve remaining fully open during the lost motion stage of clockwise rotation of the bell crank while the second valve is opened progressively through this lost motion stage for effecting a selected mixed discharge of fluid through both valves throughout this lost motion stage of clockwise rotation of the bell crank, both valves becoming fully open at the end of the lost motion stage of clockwise rotation of the bell crank, further clockwise rotation of the bell crank beyond the said lost motion stage producing progressive and simultaneous closing of both valves for stopping discharge of fluid through both valves.

9. The control means as claimed in claim 6, wherein the operating means for the first valve spindle comprise a sector plate splined to the said first valve spindle in narrow portions of the plate and having a quadrant slot in wide portions of the plate and a pin carried by the operating handle arm of the bell crank and extending into the slot and freely movable through the slot from end to end thereof, the said bell crank being loosely mounted on the first valve spindle at the fulcrum of the bell crank, the quadrant slot in the sector plate being on a circular arc having the first valve spindle as its center, movement of the pin through the slot from end to end thereof constituting the lost motion increment of rotation of the bell crank in both directions.

10. The control means as claimed in claim 7, wherein the second valve is completely open at completion of the lost motion stage of counterclockwise rotation of the bell crank while the first valve remains closed, the second valve becoming completely closed substantially coincident with complete opening of the first valve at completion of counterclockwise rotation of the bell crank, both valves being fully open at completion of the lost motion stage of clockwise rotation of the bell crank, and both valves being fully closed at completion of the clockwise rotation of the bell crank.

11. The control means as claimed in claim 9, wherein the operating means for the first valve spindle comprise a sector plate extending radially from the first valve spindle and a plurality of splines rigidly connecting the sector plate to the first valve spindle for enabling selected angular adjustments of the sector plate relative to the bell crank for selectively varying the length of the arc of rotation of the bell crank for producing a selected operation of the valves, and a plurality of splines rigidly connecting the second lever arm to the second valve spindle for adjusting the said second lever arm relative to the second valve spindle corresponding to the angular adjustment of the sector plate relative to the bell crank.

12. The control means as claimed in claim 9, including an abutment spring mounted in the quadrant slot adjacent to, but short of, an end thereof and engageable by the pin to form a stop for the pin for producing a lost motion increment of rotation of the bell crank.

13. Valve control means for controllably operating a pair of valves for delivering predetermined proportions of a plurality of fluids through fluid outlet means each of which valves is in a seperate fluid line for selectively controlling amounts of fluid passing through each line, the said valve control means comprising common actuating means for both valves operable to rotate the valves in a selected direction, a lost motion device mounted on a first valve of the pair of valves, means connecting the lost motion device and the actuating means and providing a lost motion period for the first valve during which period the first valve remains unaffected by operation of the actuating means, lever acting means directly connecting the second valve of the pair to the actuating means and immediately operating the resulting second valve responsively to operation of the actuating means while the first valve remains inoperative during its lost motion period until the actuating means has reached the end of the lost motion period during valve opening operation of the actuating means when the second valve has become fully open, the first valve still remaining closed, further operation of the actuating means beyond the lost motion period in opening direction for the first valve progressively closing the second valve while now progressively opening the first valve, the second valve becoming fully closed as the first valve becomes fully opened, thereafter reverse operation of the actuating means then progressively opening the second valve while the first valve remains fully open until the actuating means reaches the end of the lost motion period in closing direction for the valves when further operation of the actuating means beyond the lost motion period in closing direction progressively and simultaneously closes both valves.

14. Valve control means as claimed in claim 13, wherein each valve has an operating rotary spindle and the lost motion device comprises a sleeve rigidly mounted on the rotary spindle of the first valve, an operating lug on the sleeve, a discal hub concentrically mounted on the sleeve having an arcuate slot therein receiving the lug for free movement through the slot from end-to-end thereof, an operating handle connected to the hub for turning the hub relative to the said lug until the latter engages an end of the slot corresponding to directional rotation of the operating handle and hub, the operating means for the second valve of the pair including a gear rigidly mounted on the spindle of the said second valve, a rack meshing with the gear for operating the gear and the valve spindle carrying the gear, and a connecting rod having opposite ends, one of which ends terminates in the rack and the opposite end is secured to the said discal hub, the arcuate slot in the discal hub and also the said rack having lengths enabling both valves to be turned through an arc up to substantially 180° between fully open and fully closed positions.

15. Valve control means for controllably operating a pair of valves for delivering predetermined proportions of mixed hot and cold water through a common discharge outlet, one of the valves being a hot valve in a hot water line, the other of the valves being a cold valve in a cold water line, the valve control means comprising actuating link means intermediate the valves and having opposite ends connected to the valves, arcuately operable crank means for turning both valves loosely mounted on the hot valve and pivotally secured to the link means, the crank means having the hot valve as center of rotation and being selectively operative in clockwise and counterclockwise directions, a lost motion device loosely mounted on the hot valve and operatively connected to the link means for actuating the link means to turn the cold valve from closed position to open position responsively to operation of the crank means in counterclockwise direction to a counterclockwise directional inactive limit of the lost motion device which substantially corresponds to the center of the arc of rotation of the crank means, the lost motion device remaining inactive with respect to the hot valve until the crank means is coincident with the counterclockwise directional inactive limit of the lost motion device, further counterclockwise rotation of the crank means reversing direction of actuation of the link means and opening the hot valve while closing the cold valve and mixing hot and cold water in inverse proportions for producing a constant volume of discharge of a varying mixture of hot and cold water through the common discharge outlet until the hot valve is fully open and the cold valve fully closed, reverse operation of the crank means in clockwise direction reversing operation of the valves.

References Cited in the file of this patent
UNITED STATES PATENTS

| | | |
|---|---|---|
| 842,961 | Kewley | Feb. 5, 1907 |
| 993,806 | Taylor | May 30, 1911 |
| 1,156,977 | Cloos | Oct. 19, 1915 |
| 1,222,865 | Haughton | Apr. 17, 1917 |
| 1,641,560 | Whidden | Sept. 6, 1927 |
| 1,839,807 | Shafer | Jan. 5, 1932 |
| 2,033,941 | Kryzanowsky | Mar. 17, 1936 |